United States Patent [19]
Tanahashi

[11] Patent Number: 5,432,304
[45] Date of Patent: Jul. 11, 1995

[54] COORDINATE INPUT APPARATUS WITH CORRECTION RESISTANCE FOR RECTANGULAR, SPACED RESISTANCE SURFACES

[75] Inventor: Makoto Tanahashi, Kanagawa, Japan

[73] Assignee: Sony Corporation, Japan

[21] Appl. No.: 247,073

[22] Filed: May 20, 1994

[30] Foreign Application Priority Data

May 31, 1993 [JP] Japan .................................. 5-149908
Oct. 12, 1993 [JP] Japan .................................. 5-277305

[51] Int. Cl.6 ...................... G08C 21/00; G09G 3/02
[52] U.S. Cl. .................................... 178/18; 178/19; 178/20; 345/173; 345/179; 345/182
[58] Field of Search .................. 178/18, 19, 20; 345/173, 177, 179, 182

[56] References Cited

U.S. PATENT DOCUMENTS

| | | | |
|---|---|---|---|
| 4,752,655 | 6/1988 | Tajiri | 178/20 |
| 4,794,634 | 12/1988 | Torihata | 345/182 |
| 4,929,934 | 5/1990 | Ueda | 178/18 |
| 4,983,787 | 1/1991 | Kunikane | 345/173 |
| 5,266,750 | 11/1993 | Yatsuzuka | 178/19 |
| 5,324,895 | 6/1994 | Inamori | 178/20 |

Primary Examiner—Stephen Chin
Assistant Examiner—Vijay Shankar
Attorney, Agent, or Firm—Ronald P. Kananen

[57] ABSTRACT

A coordinate input apparatus for detecting and inputting the coordinates of pressure applied by a pen, includes an input surface and a detection apparatus. The input surface is constructed from first and second input detection members. The first input detection member has a rectangular resistance surface which has electrodes installed at its long ends. The second input detection member has a rectangular resistance surface which has electrodes installed at its short ends. The resistance surfaces for these first and second input members are overlaid so as to not ordinarily come into contact with each other. When pressure is applied to the input surface, the resistance surfaces for the first and second input detection members come into contact with each other. The detection apparatus detects the resistor at the pressurized portion at this time and obtains input coordinates for the X-Y coordinate axes at the input surface. A correction resistor which is connected to at least one of the electrodes disposed at each of the sides of the first input detection member is formed in the same plane and from the same member as the first resistor for the first input detection member.

11 Claims, 16 Drawing Sheets

COORDINATE INPUT APPARATUS WITH CORRECTION RESISTANCE FOR RECTANGULAR, SPACED RESISTANCE SURFACES

BACKGROUND OF THE INVENTION

1. Field Of The Invention

The present invention relates to a coordinate input apparatus, and more particularly to a coordinate input apparatus which detects the position of pressure applied to an input surface.

2. Description Of The Related Art:

Image input apparatuses such as those in which, for example, a user traces on or applies pressure to a board which is used as an input surface using a pen or the like, and the marks made by the pen are then portrayed as an image on monitor apparatus or are stored in memory as image data, are well known.

This kind of image input apparatus is used in, for example, games and graphics. Here, in order to detect the input position which is being drawn on the input surface, a coordinate input apparatus which detects the pressure position, i.e. the input position, as X-Y coordinate data on the input surface is used.

A coordinate input apparatus has a structure as shown, for example, in FIG. 1. In FIG. 1, numerals 1 and 2 indicate input detection members, with the first input detection member 1 having a rectangular resistance surface RY. Electrodes 1a and 1b are then formed at each of the long sides of this resistance surface RY. The second input detection member 2 has a rectangular resistance surface RX having electrodes 2a and 2b formed at each of the short sides thereof.

Sheet-shaped insulation sheets formed using, for example, PET, are used as the substrates for the input detection members 1 and 2. Rectangular resistance surfaces RX and RY are then formed on the surface of these substrates using, for example, a carbon printing process.

A voltage of, for example, 5 V is applied to the electrode 1a via the switch 3 and the electrode 1b is connected to earth via an external variable resistor Rg and a switch 4.

A voltage of, for example, 5 V is applied to the electrode 2a via a switch 5 and the electrode 2b is connected to earth via a switch 6.

Also, the electrode 1a is connected to a terminal Tx of a switch 7 and the electrode 2a is connected to a terminal Ty of the switch 7.

Numeral 8 indicates an A/D converter for converting the voltage supplied from the switch 7 into digital data, numeral 9 indicates an image memory section for storing digital data outputted from the A/D converter 8 as inputted coordinate values and numeral 10 indicates a controller for controlling the operation of the image memory section 9 and the switching of the switches 3 to 7.

In this coordinate input apparatus, the input detection members 1 and 2 are overlaid via the spacers SP, so as their resistance surfaces do not come into contact with each other, as shown in FIG. 2. Then, the surface sheet 11 becomes the input surface. An image input apparatus 12 such as that shown in FIG. 3, for example, can then be made using this kind of coordinate input apparatus. The area 13 of the image input apparatus 12 indicated by slanting lines is the input surface, which is made up of the input detection members 1 and 2. If a trace is made with a pen P on this input surface 13, the position coordinates for each of the pressurized points are detected by the coordinate input apparatus in FIG. 1 and stored in the image memory section 9. Although a detailed explanation is omitted here, by sending the data stored in the image memory section 9 to the monitor 14 as an image signal, images traced with a pen P on the input surface 13 can be outputted as images on the monitor.

The coordinate input apparatus is such that if pressure is applied to a point with a pen P in the manner shown in FIG. 2, resistance surface RY and resistance surface RX make contact only at the portion to which pressure has been applied. The values for the X and Y coordinates on the input surface are then obtained by detecting the resistance at this time. The operation for detecting these X and Y coordinates is described below.

In FIG. 1, the controller 10 outputs a switching control signal Ssw of, for example, 1 kHz pulses, to the semiconductor switches 3 to 7. Each switch then switches between the state shown by the solid line and the state shown by the dotted line in the diagram by way of the switching control signal Ssw, in 1 kHz cycles.

When each of the switches 3 to 7 is in the state shown by the solid lines, the X-coordinate for the input point is being detected, i.e. a voltage of 5 V is applied to the electrode 2a of the input detection member 2 and the electrode 2b is connected to earth. It follows that the values for the voltage will differ along the resistance surface RX in the X-axis direction. In an example under ideal conditions, the voltage would be 5 V at the portion connected to electrode 2a, 0 V at the portion connected to electrode 2b and 2.5 V at a position midway along the direction of the X-axis.

On the other hand, regarding the input detection member 1 at this time, the electrode 1a acts as the detection terminal for the X-coordinate, i.e. the output voltage from the electrode 1a is sent to the A/D converter 8 via terminal Tx of switch 7.

If a given point is then compressed, the resistance surface RX and the resistance surface RY come into contact at the compressed point. The voltage between the electrode 1a and the point on the resistance surface RX which has been compressed is then taken as the X-coordinate voltage. This voltage is then converted into digital data by the A/D converter 8 before being input to the image memory section 9 as the X-coordinate.

Alternatively, when each of the switches 3 to 7 is in the state shown by the dotted lines, the Y-coordinates for the input point are detected, i.e. a voltage of 5 V is applied to the electrode 1a of the input detection member 1 and the electrode 1b is connected to earth via the external resistor Rg. It follows that the values for the voltage will differ along the resistance surface RY in the Y-axis direction.

Regarding the input detection member 2, the electrode 2a acts as the Y-coordinate detection terminal, i.e. the output voltage for the electrode 2a is sent to the A/D converter 8 via a terminal Ty of the switch 7.

In this state, the voltage across the resistance surface RY to the point at which the input surface is depressed, i.e. the voltage value as a Y-coordinate, is obtained from the electrode 2a. This voltage is then converted to digital data by the A/D converter 8 before being inputted to the image memory section 9 as the Y-coordinate.

By constructing the coordinate input apparatus in this way, it is possible to input items such as images.

A further example of a construction for a coordinate input apparatus is shown in FIG. 4. Portions which are the same as portions in FIG. 1 will be given the same numerals and a detailed description thereof will be omitted.

Here, the input detection members are indicated by numerals 15 and 16. The input detection member 15 is rectangular, with a resistor RY formed along its short end with respect to the input surface so as to follow the direction of the Y-axis. Electrodes 15a and 15b are provided at both ends of this resistor. Conductive wires 15c protrude from the resistor RY so as to run parallel to the X-direction. These conductive wires 15c are formed at intervals of pixel units in the Y-axis direction.

The input detection member 16 has a resistor RX formed therealong in the direction of the long side of the rectangular input surface, i.e. the X axis direction. Electrodes 16a and 16b are then set up at each end of this resistor RX. Conductive wires 16c running parallel to the Y-axis direction then protrude from the resistor RX. These conductive wires 16c are spaced at intervals of pixel units in the X-axis direction.

In this case, the coordinate detection method is almost the same as that for the example in FIG. 1. If pressure is applied to a point on the input surface, one or more of the conductive wires 15c and one or more of the conductive wires 16c will come into contact with each other. It follows that when each of the switches 3 to 7 is in the state shown by the solid lines, the voltage at the resistor RX corresponding to the X-axis coordinate is taken from the electrode 15a. Also, when each of the switches 3 to 7 are in the states shown by the dotted lines, the voltage at the resistor RY corresponding to the Y-axis coordinate is taken from the electrode 16a. These voltages are then converted into digital data by the A/D converter 8 before being put into the image memory section 9 as the coordinate data.

With this kind of coordinate input apparatus, the input surface which acts as the X and Y coordinate detection region corresponding to the monitor screen for the image input apparatus of the kind, for example, shown in FIG. 3, is usually rectangular. That is to say, the lengths of the X-axis and Y-axis are different.

Since the lengths of the X and Y axes which are taken as the coordinate axes are different, the number of pixels allotted to the X and Y directions in the memory for storing the detected coordinate data is different.

Also, the same voltage is applied to the resistors RX and RY for the X-axis and the Y-axis. Voltages are obtained which correspond to X-axis and Y-axis coordinates and these are then converted to digital data using the same A/D converter 8. This, however, means that the coordinate data obtained from the A/D converter 8 and the pixel memory allotted to the coordinate positions in the image memory section 9 become incompatible.

For example, the following points should be considered: the ratio between the size of the coordinates for the X-axis and Y-axis; the memory pixel allotment numbers of 256:212; and the application of the same 5 V to the resistance surface RX for X-axis detection and to the resistance surface RY for Y-axis detection. Also, data conversion then takes place using the A/D converter 8 which has a resolution of 256. At this time, with regard to the detection of the X-axis coordinate, the A/D converter 8, having a resolution of 256, is used for converting the voltage for the X-axis input position. This is then stored in the image memory section 9, which is a 256 pixel memory.

However, with Y-axis coordinate detection, the voltage corresponding to the Y-axis input position uses the A/D converter 8 which has a resolution of 256. This then has to be made into 212 step data to correspond with the number of memory pixels. This is, of course, extremely difficult and the image memory 9 is therefore unsuitable for processing the Y-coordinate data.

As a result, an external resistor Rg is connected in series via the electrode 1b so as to follow the direction of, for example, the Y-axis (i.e. the short axis). The value of the external resistor Rg is then chosen so that the ratio between the voltage dropped across the resistor RY for the Y-axis input coordinate surface and the voltage dropped across the external resistor Rg is the same as the ratio between the length of the Y-axis and the length of the X-axis minus the Y-axis. For example, in the example where X: Y=256:212, the ratio RY:Rg is taken to be 212:44. As the voltage detected on the resistor RY is adjusted for a resolution of 256 in this way, the aforementioned problem no longer exists.

The external resistor Rg can also be set up in the same way as in the case of the example shown in FIG. 4 and deficiencies in the X-Y pixel ratio can be adjusted.

However, with normal flat board resistors for detecting positions on coordinate axes, the precision of the resistor RX for the X-axis surface and the resistor RY for the Y-axis surface is not very high.

If the resistance surface is formed by printing, on the whole, the resistance of the resistance surface area is fairly uniform. However, the overall resistance of each manufactured input detection member varies by, for example, plus or minus twenty percent.

It is therefore necessary for the external resistor Rg to be a variable resistor. In order to resolve deficiencies in the X-Y pixel ratio, it is then necessary to adjust the resistance of the external resistor Rg for each coordinate input apparatus at the time of manufacture so that the ratio RY:Rg becomes the value mentioned above, or a number of times that value.

The inclusion of an external resistor Rg in the conventional coordinate input apparatus means that the number of parts is increased along with cost. Also, the amount of work involved in adjusting the resistance of the resistor Rg makes the process inefficient.

SUMMARY OF THE INVENTION

It is, therefore, an object of the present application to provide a coordinate input apparatus which resolves the above-mentioned problems.

According to the present invention, there is provided a coordinate input apparatus which possesses an input surface and a detection apparatus. The input surface is constructed from first and second input detection members. The first input detection member has a rectangular resistance surface which has electrodes installed at the long ends thereof. The second input detection member has a rectangular resistance surface which has electrodes installed at the short ends thereof. The resistance surfaces for these first and second input members are overlaid so as to not come into contact with each other. When pressure is applied to the input surface, the resistance surfaces of the first and second input detection members come into contact with each other. The detection apparatus detects resistance when these surfaces come into contact with each other at the pressurized portion and obtains input coordinates on the X-Y coordinate axes for the input surface. A correction resistor, which is connected to at least one of the electrodes set up at each of the sides of the first input detection member, is formed in the same plane and from the same member as the first resistor for the first input detection member.

Also according to the present invention, there is provided a further coordinate input apparatus which includes an input surface and a detection apparatus. The input surface is constructed from first and second input detection members. The first input detection member has a resistor formed along one of its short sides with respect to the rectangular input surface. Pixel-spaced conductive wires are provided which run parallel to the long side of the input surface from this resistor, and electrodes are set up at both ends of this resistor. The second input detection member has a resistor formed along one of its long sides with respect to the rectangular input surface. Pixel-spaced conductive wires are provided which run parallel with the short side of the input surface from this resistor, and electrodes are set up at both ends of this resistor. The conductive wires from the first and second input detection members are overlaid in a matrix so as not to come into contact with each other. When pressure is applied, the conductive wires for the first input detection member and the conductive wires for the second input detection member come into contact with each other. The detection apparatus detects the resistance when the conductive wires for the first and second input detection members come into contact with each other at a pressurized portion and obtains input coordinates on the X-Y coordinate axes for the input surface. A correction resistor which is connected to at least one of the electrodes set up at each of the sides of the first input detection member is formed in the same plane and from the same member as the first resistor for the first input detection member.

According to the present invention, by setting up a correction resistance surface or correction resistor in the same plane as the resistance surface or resistor for the first input detection means which is part of the structure of the input surface, the setting up of an external resistor becomes unnecessary. By then making this correction resistance surface or correction resistor correspond to the ratio of the lengths of the long and short sides of the input surface, resolution compatibility can be attained for the detection voltage for the short side (Y-direction) input coordinates.

BRIEF DESCRIPTION OF THE DRAWINGS

The invention will be more readily understood with reference to the accompanying drawings, wherein.

DETAILED DESCRIPTION OF THE PREFERRED EMBODIMENTS

First Embodiment

The following is a description, with reference to the diagrams, of the coordinate input apparatus of this invention.

In each of the following embodiments, portions which are the same as portions in FIGS. 1 to 4 have been given the same numerals and detailed descriptions thereof will be omitted.

Figure 1:
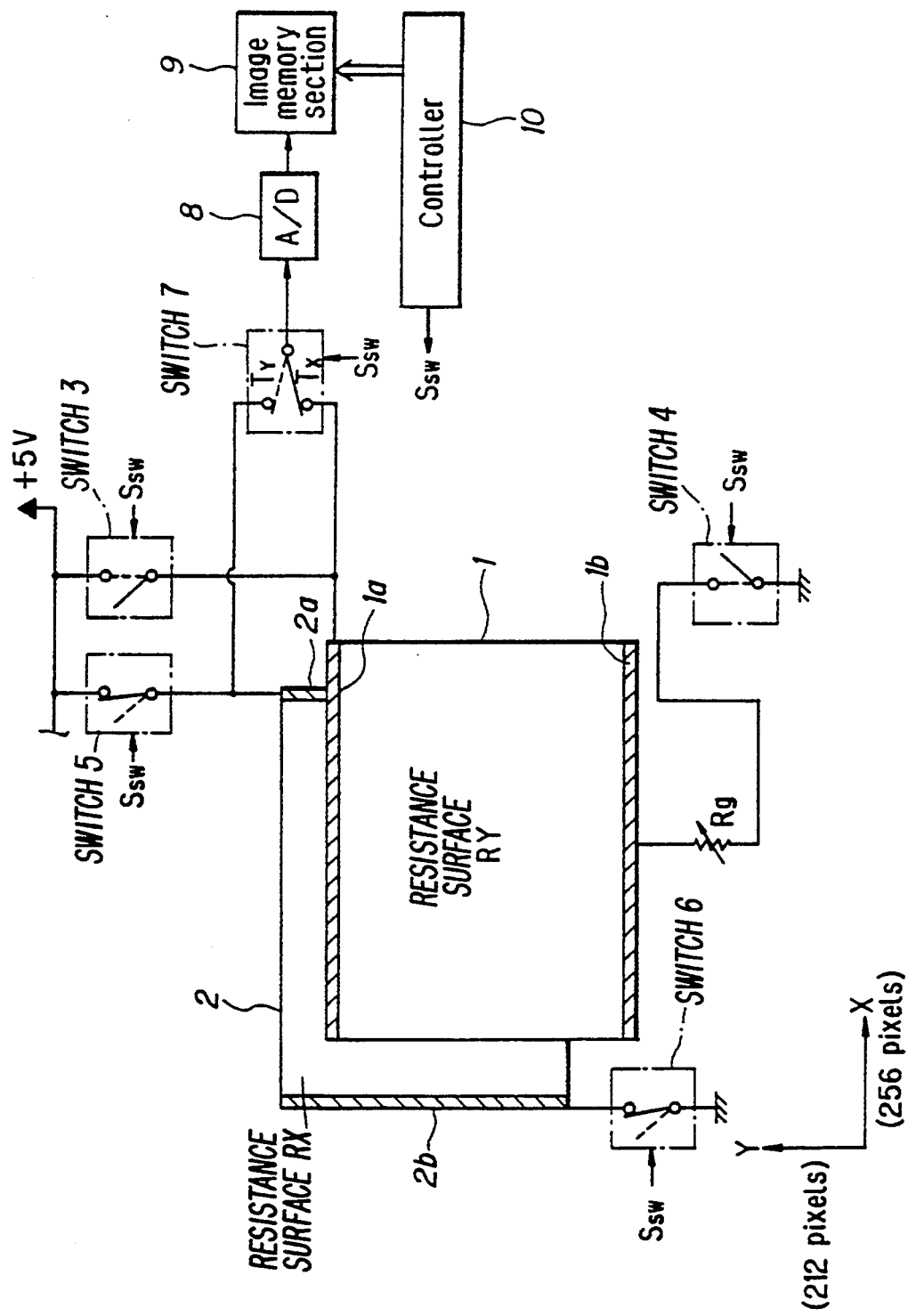
FIG. 1 is a block diagram showing an example of the structure of a coordinate input apparatus which preceded this invention.
Figure 2:
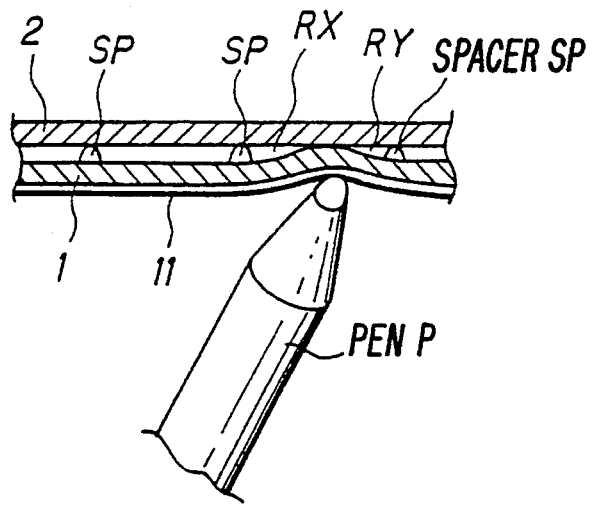
FIG. 2 is a cross-sectional view showing a state where the input detection members for the coordinate input apparatus are overlaid.
Figure 3:
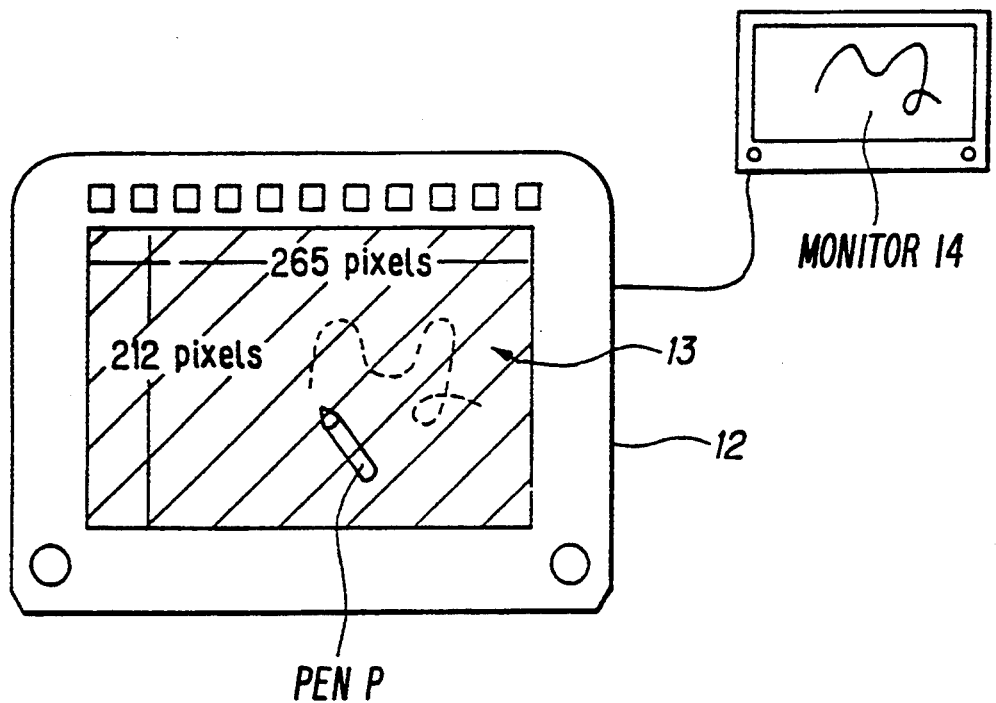
FIG. 3 is a view describing the construction of an image input apparatus which employs the coordinate input apparatus.
Figure 5:
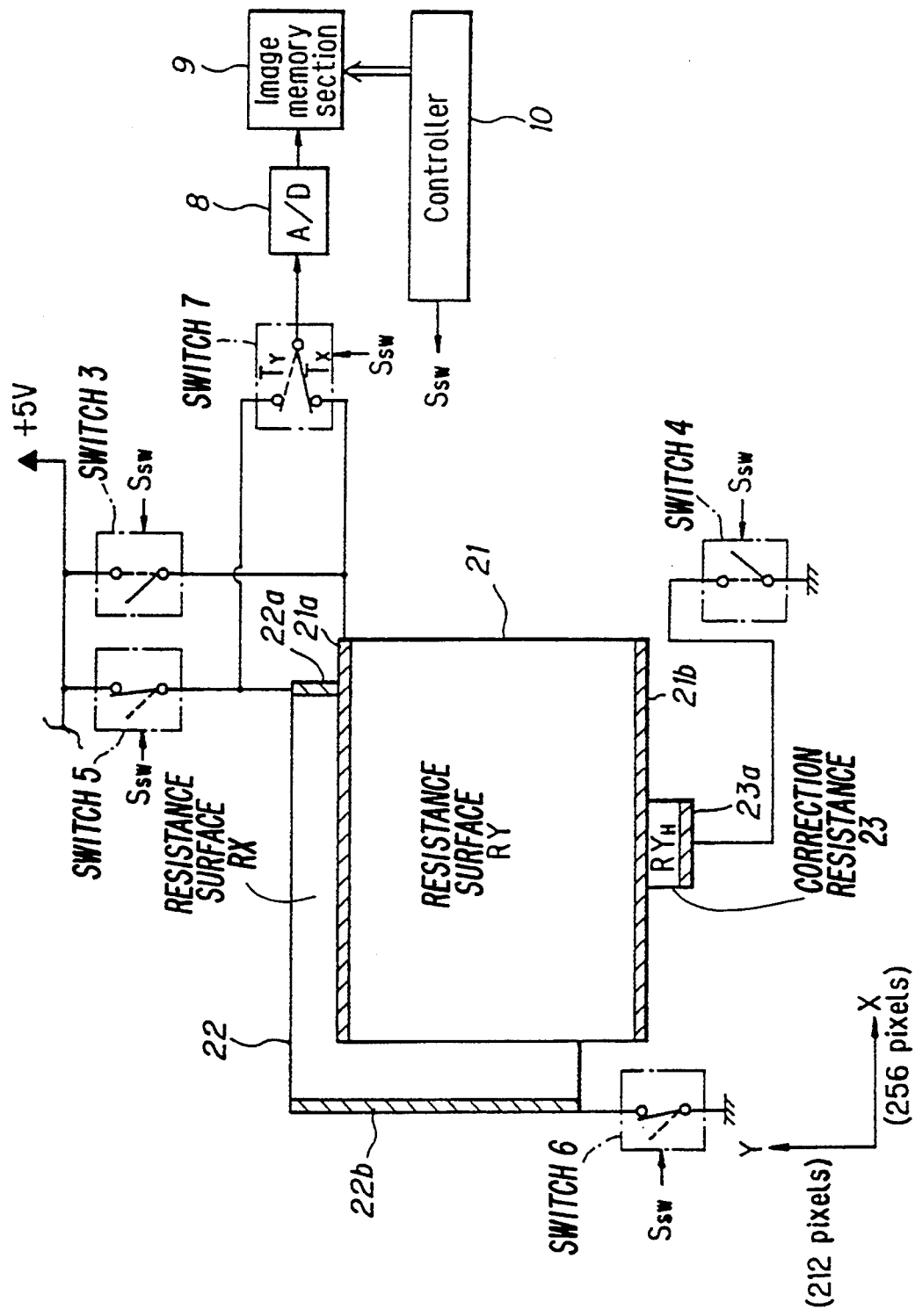
FIG. 5 is a block diagram showing a first embodiment of the coordinate apparatus of this invention.

FIG. 5 is a view of a first embodiment, for which the method for performing input coordinate detection is the same as that for the coordinate input apparatus in FIG. 1.

In the embodiment of FIG. 5, numerals 21 and 22 indicate input detection members, input detection member 21 having a rectangularly formed resistance surface RY which has electrodes 21a and 21b formed along its long sides. The input detection member 22 then has a rectangularly formed resistance surface RX which has electrodes 22a and 22b formed at its short sides.

The input detection members 21 and 22 are formed in sheets in the same way as described previously. Insulation sheets formed using, for example, PET, are used as the substrates for the input detection members 21 and 22. Rectangular resistance surfaces RX and RY are formed on the surfaces of the substrates using a screen printing technique employing, for example, carbon as the resistor. Methods other than printing which apply carbon to the surface may be used.

In the same way as for the example in FIG. 1, voltages of, for example, 5 V are applied to the electrodes 21a and 22a via switches 3 and 5 respectively. An electrode 22b may then be connected to an earth via switch 6.

When each of the switches 3 to 7 is in the position shown by the solid lines, the voltage for the position of the X coordinate on the resistance surface RX is obtained from the electrode 21a and goes, via the A/D converter 8, into the image memory section 9. Also, when each of the switches 3 to 7 is in the position shown by the dotted lines, the voltage for the position of the Y coordinate on the resistance surface RY is obtained from the electrode 22a and input to the image memory section 9 via the A/D converter 8.

If the X-axis is taken to have 256 pixels, the Y axis is taken to have 212 pixels and the A/D converter 8 is taken to have a resolution of 256, incompatibilities occur between the value for the detection voltage, the A/D converter resolution and the pixel number for the image memory 10 when detecting Y coordinates. In order to remove these incompatibilities, in this embodiment a correction resistor portion 23 in the form of a correction resistance surface $RY_h$ is formed opposite the resistance surface RY at approximately the central portion of the electrode 21b on the input detection member 21. This correction resistance surface $RY_h$ is then connected to earth via an electrode 23a and a switch 4 and is formed from the same member which forms the resistor for the Y-axis detection resistance surface RY. This correction resistance surface $RY_h$ is formed using a printing method such as carbon screen printing at the same time as the resistance surface RY is formed.

A voltage of 5 V, which is applied during detection of the Y-axis coordinate, is therefore applied across the electrodes 21a and 23a. The voltage of 5 V applied during the detection of the X-coordinate then goes across the electrodes 22a and 22b via the compensation resistance surface $RY_h$.

During X-axis detection, with regard to the X-coordinate data, the 5 V which is applied across the electrodes 22a and 22b is divided up into 256 voltage steps for detection because the resolution of the A/D converter 8 is 256. During Y axis detection, 5 V is applied across the electrodes 21a and 23a. At this time, in order for the 212 pixel coordinate data to be appropriately educed at the A/D converter 8, which has a resolution of 256, the ratio between the resistor between the electrode 21a and the electrode 21b and the resistor between the electrode 21b and 23a, i.e. the ratio RY:RYH, should be 212: (256-212), which is 212:44.

It is therefore preferable to form the correction resistance surface $RY_h$ for voltage adjustment in such a manner that the ratio between the voltage across it and the resistance surface RY for Y axis detection is as though the length of the Y-axis and the X-axis were the same.

Usually, the resistor R of rectangular resistance surfaces which are sandwiched between electrodes is inversely proportional to the length "L" of the electrodes and proportional to the relative distance "d" between the electrodes. If r is taken to be the resistor of the resistor member per unit of surface area, the resistor R is expressed by $R = r \times d/L$. It follows that in addition to making the correction resistance surface $RY_h$ of the same member as the resistor body for the Y-axis detection resistance surface RY, it should also be formed using the same printing process. In this way, the resistor ratio RY:$RY_h$ can be decided by selecting the length L of the correction resistance surface $RY_h$ and the distance d between the electrodes appropriately.

As the member for the resistor bodies is the same and if the dimensions for the resistance surface RY for Y-axis sensing and the correction resistance surface $RY_h$ are decided, the resistor ratio (RY:$RY_h$) is automatically decided, i.e. this ratio can be decided irrespective of inconsistencies in the resistor member and the resistor between the electrodes. If a fixed voltage of, for example, 5 V is then applied across electrode 21a and electrode 23a during Y-axis coordination detection, the objective voltage at the resistance surface RY (at a voltage distribution for the 212 steps which concurs with the distribution for the A/D converter) can be obtained without adjustment.

This is to say that, in this embodiment, there is no need for a variable resistor for adjusting the voltage across the resistance surface RY for Y-axis detection to take into account the discrepancy in the number of pixels.

In fact, the electrode 22b possesses a certain degree of resistance, inconsistencies in which will have an effect on inconsistencies in the resistor ratio RY:$RY_h$. As a result, in this embodiment, as is shown in FIG. 5, the correction resistor $RY_h$ is disposed in the center of the electrode 21b, so as to minimize the effects of the resistor of the electrode 21b. This will give an electrode resistance when viewed from the point of view of the correction resistance surface $RY_h$ of half that when it is set up at the end of the electrode 21b.

Second Embodiment

The following is a description of a second embodiment of this invention.

Figure 6:
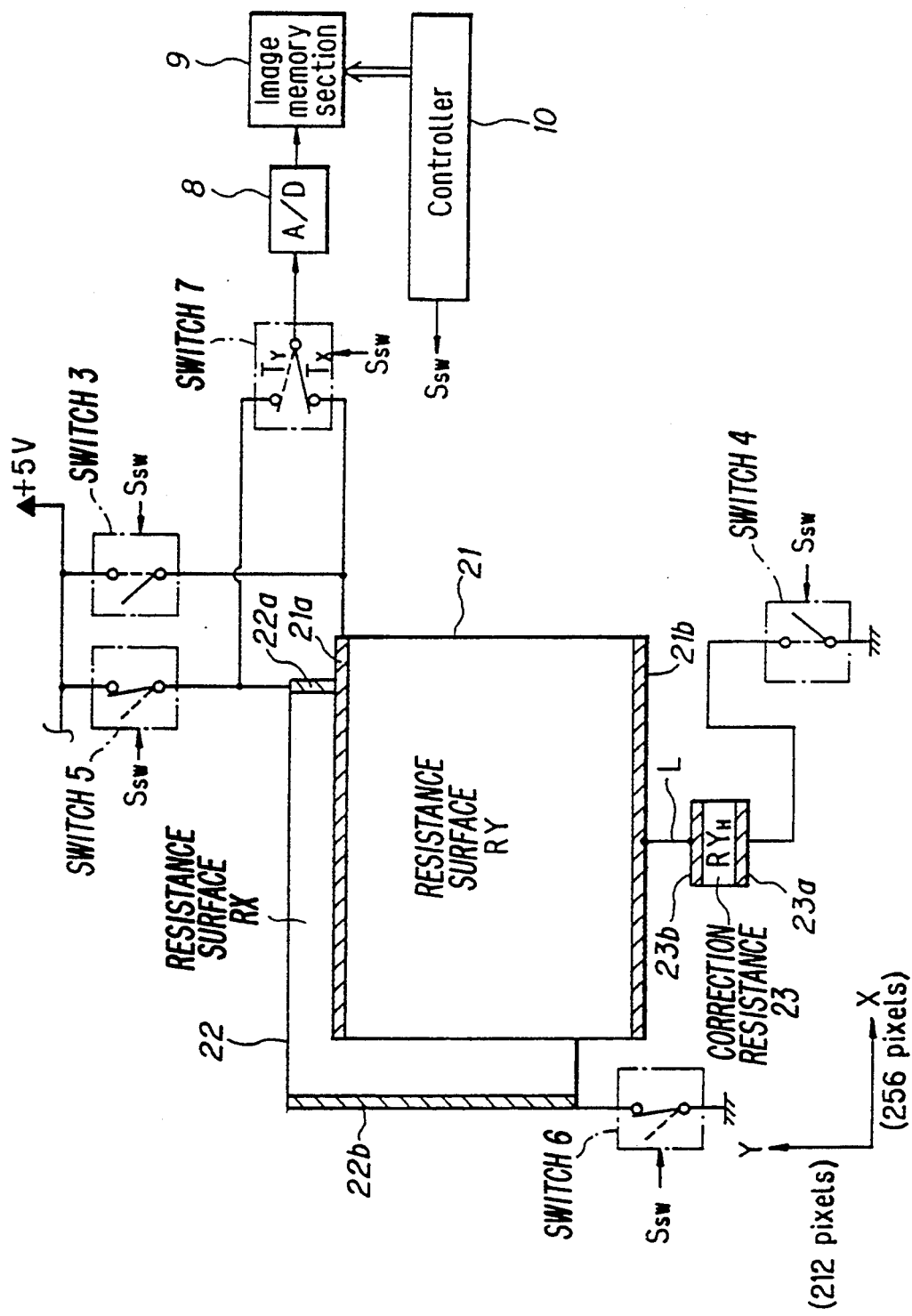
FIG. 6 is a block diagram showing a second embodiment of the coordinate apparatus of this invention.

In this second embodiment shown in FIG. 6, the correction resistance surface $RY_h$ for the correction resistor portion 23 is not physically connected to the electrode 21b, as is the case in the first embodiment. Instead, electrodes 23a and 23b are formed on each end of the correction resistance surface, and electrode 23b and electrode 21b for the resistance surface RY are joined together via a lead L (printed circuit wire).

The electrode 23a of the correction resistance surface RYH is then connected to earth via the switch 4.

Third Embodiment

Figure 7:
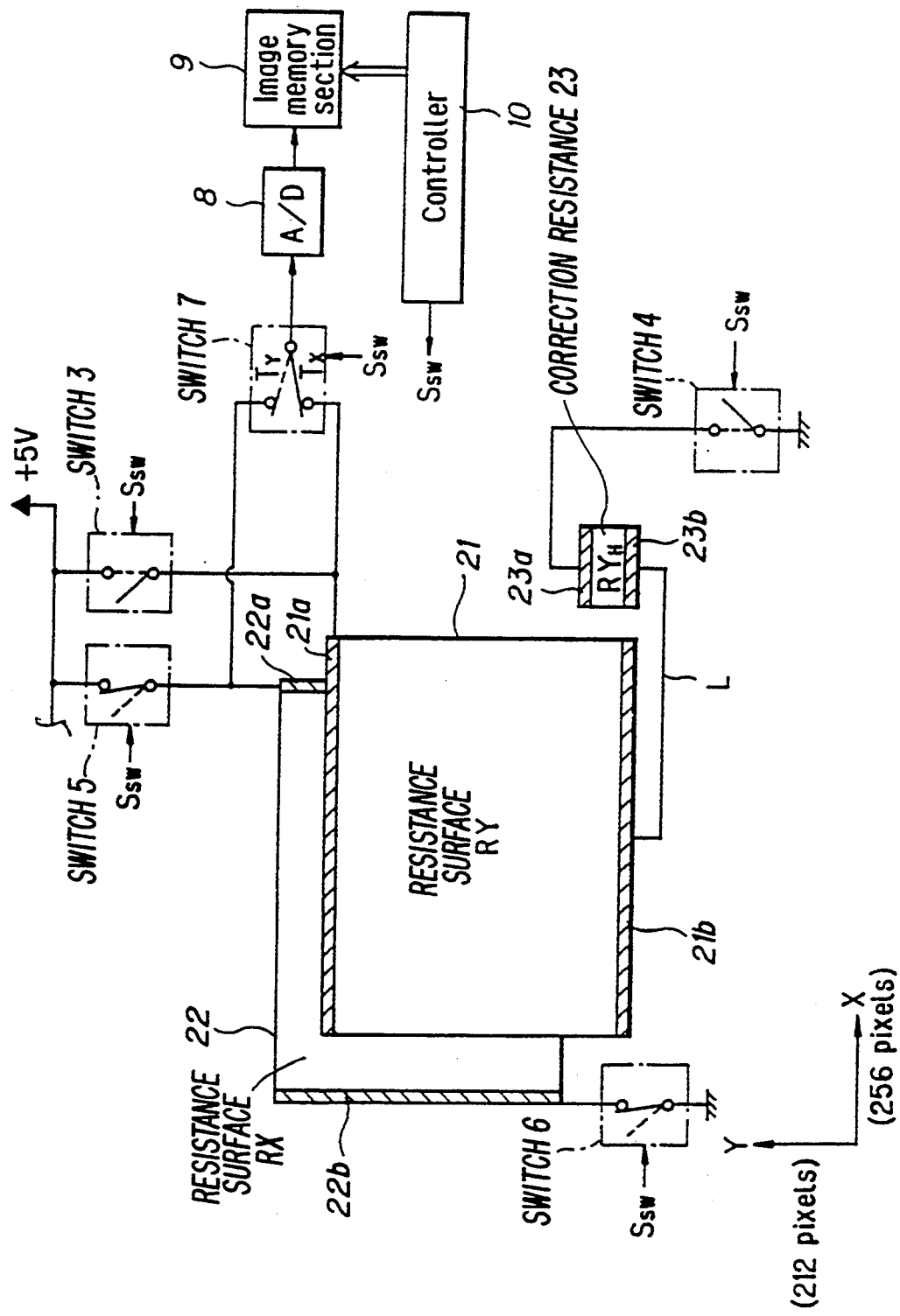
FIG. 7 is a block diagram showing a third embodiment of the coordinate apparatus of this invention.

In a third embodiment of the present invention in FIG. 7, the connection conditions for the correction resistor portion 23 are the same as for the second embodiment, but the correction resistor portion 23 is positioned so that the electrode 21b is on the same side as the resistance surface RY.

Fourth Embodiment

Figure 8:
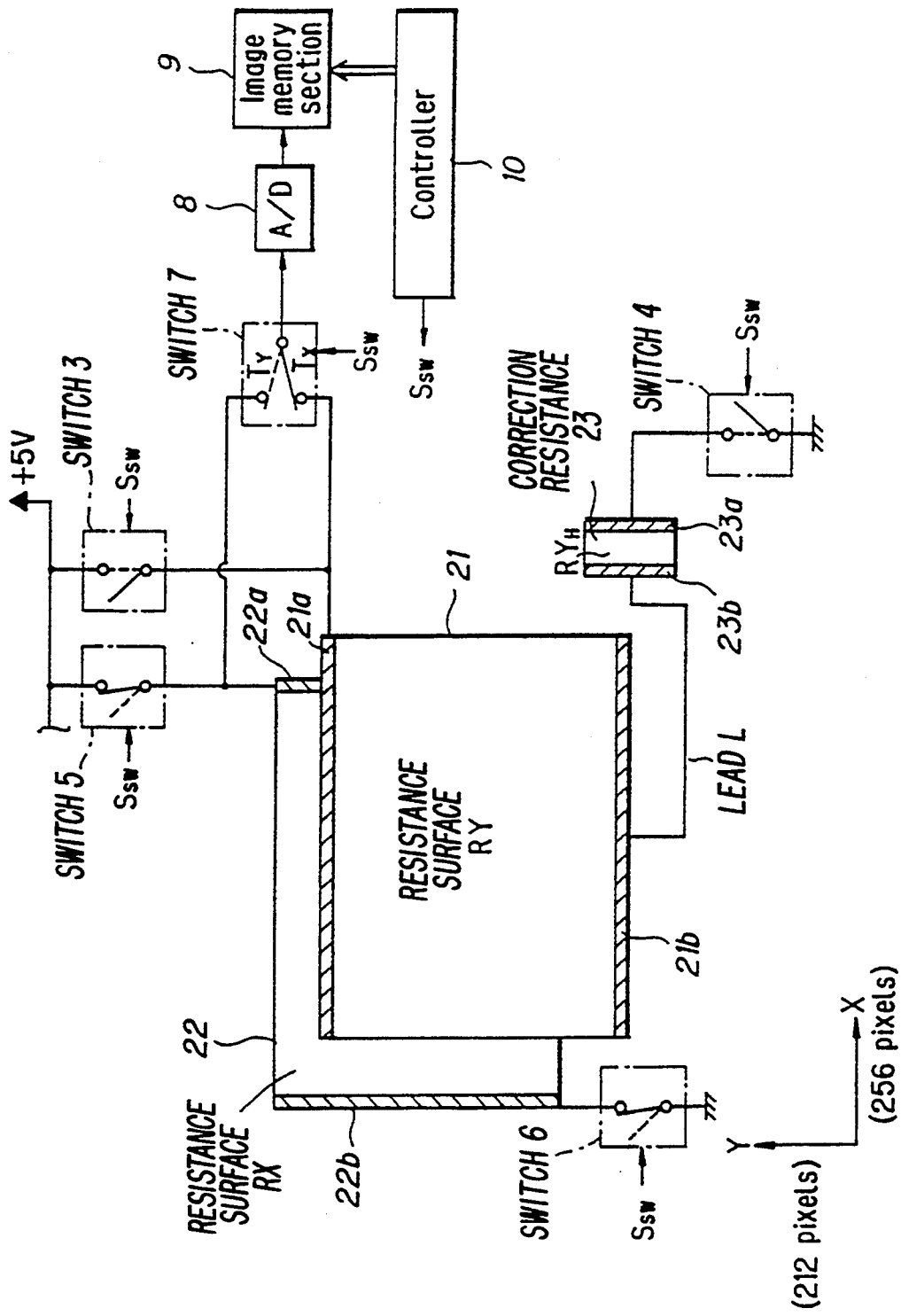
FIG. 8 is a block diagram showing a fourth embodiment of the coordinate apparatus of this invention.

In a fourth embodiment of the present invention, the position of the correction resistor portion 23 connected by the conductive wire L has been changed, as can be seen in FIG. 8.

Fifth Embodiment

Figure 9:
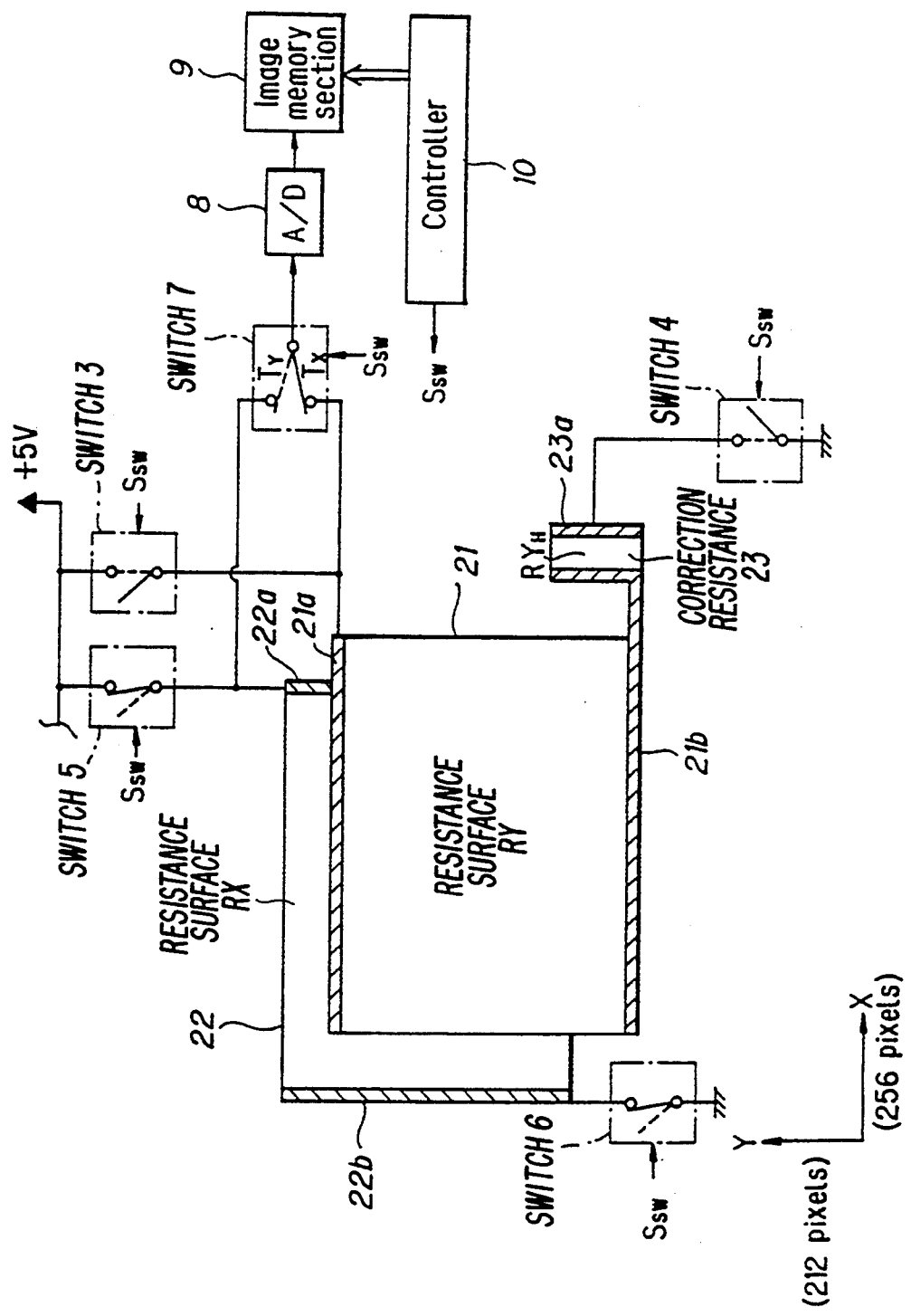
FIG. 9 is a block diagram showing a fifth embodiment of the coordinate apparatus of this invention.

In a fifth embodiment of the present invention, shown in FIG. 9, the correction resistance surface $RY_h$ is physically connected to the electrode 21b of the resistance surface RY, in the same way as in the first embodiment in FIG. 5. In this case, however, the electrode 21b has been extended and bent over and the correction resistor $RY_h$ has then been formed so as to be positioned at the shorter end of the resistance surface RY.

Sixth Embodiment

Figure 10:
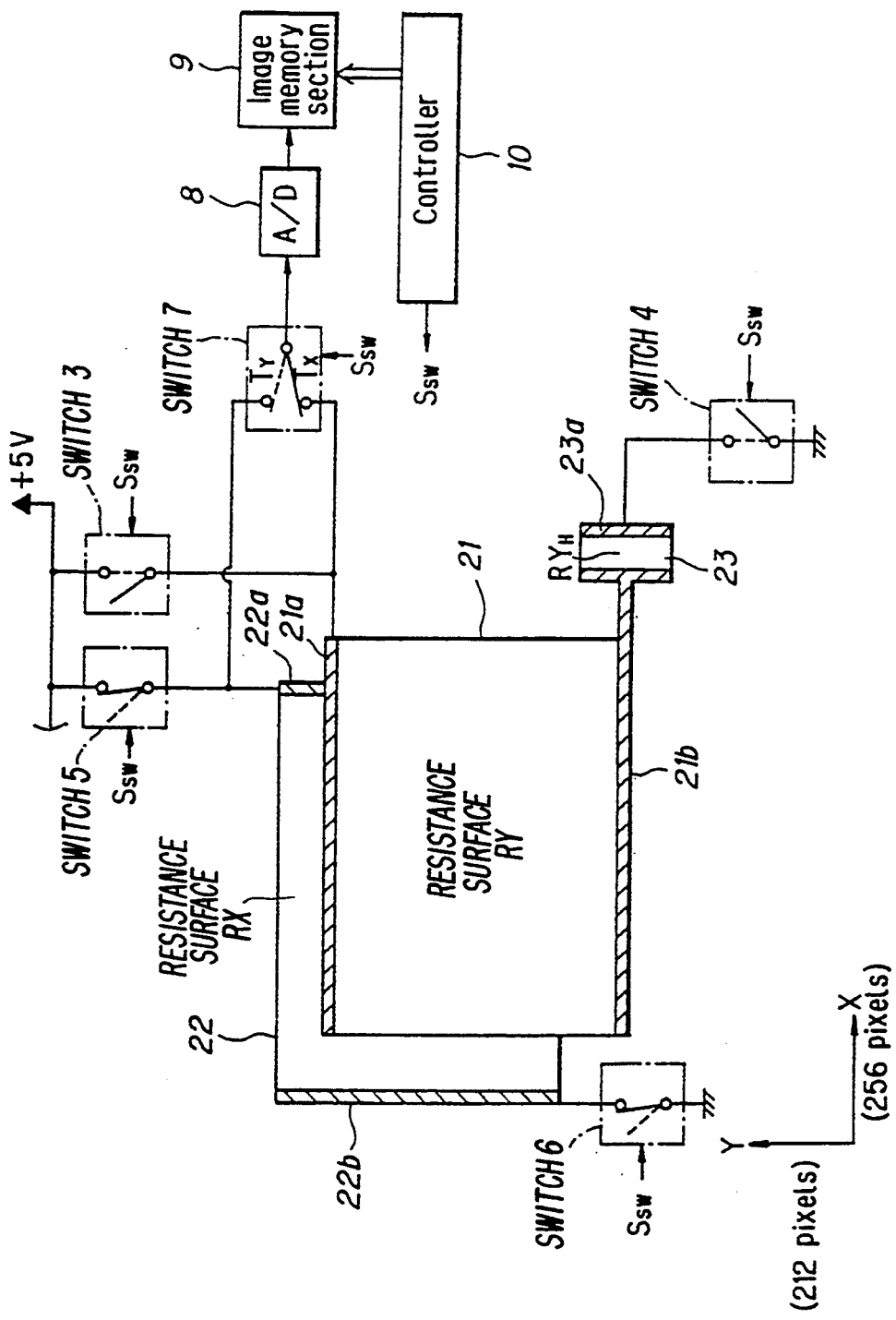
FIG. 10 is a block diagram showing a sixth embodiment of the coordinate apparatus of this invention.

In a sixth embodiment, shown in FIG. 10, the electrode 21b has been extended into a T-shape and the correction resistance surface $RY_h$ has then been formed so as to be connected onto the top of this T-shape.

Seventh Embodiment

Figure 11:
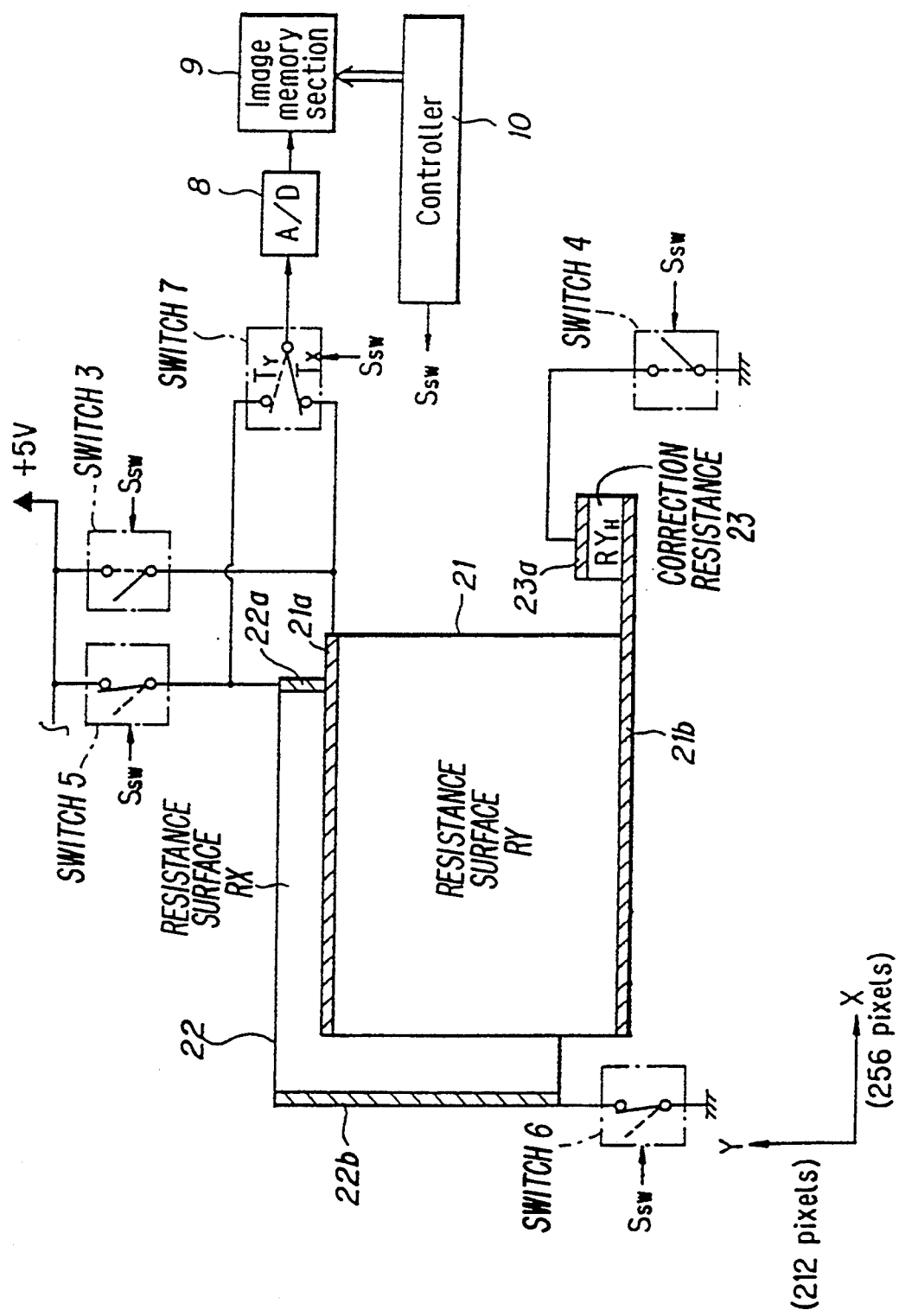
FIG. 11 is a block diagram showing a seventh embodiment of the coordinate apparatus of this invention.

In a seventh embodiment of the present invention, shown in FIG. 11, the electrode 21b has been extended in a straight line. A resistor correction surface $RY_h$ has then been formed from the extended portion in the same direction as the resistance surface RY.

Eighth Embodiment

Figure 12:
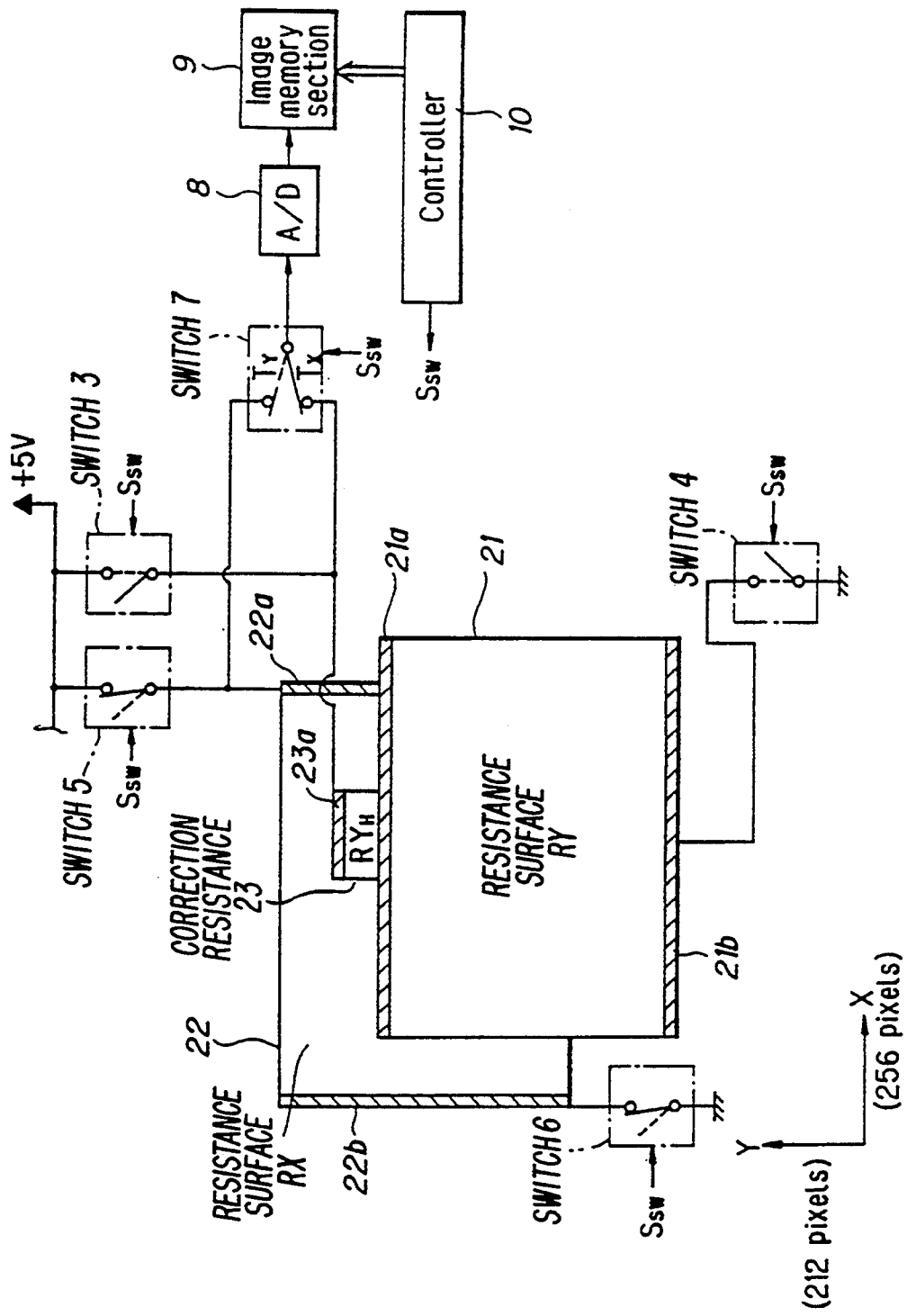
FIG. 12 is a block diagram showing an eighth embodiment of the coordinate apparatus of this invention.

An eighth embodiment is shown in FIG. 12. In this case, the correction resistor portion 23 has been formed on the same side as the electrode 21a. The electrode 23a for the correction resistor portion 23 is connected to switch 7 and switch 3, and the correction resistance surface $RY_h$ is formed between the electrode 23a and the electrode 21a.

The same effects as were obtained for the first embodiment are also obtained for these embodiments 2 to 8. By then using any of the various set-ups for the arrangement of the correction resistor portion 23 in these embodiments, a suitable coordinate input apparatus can be provided which takes into account the external casing shape, the substrate shape and the internal structural shape etc., and so forth, of the equipment in which the coordinate input apparatus for this invention is to be installed.

In these embodiments, the resistance surface RY and the correction resistance surface $RY_h$ are printed on the same flat surface of a prescribed member or sheet. It would also be possible to connect the resistance surface RY and the correction resistance surface $RY_h$ with, for example, a lead L and bend them over during product installation so as to reduce the amount of flat space occupied thereby.

Also, in each of the above embodiments, the correction resistance surface $RY_h$ may be connected to the side of either of the electrodes 21a or 21b.

Ninth Embodiment

Figure 13:
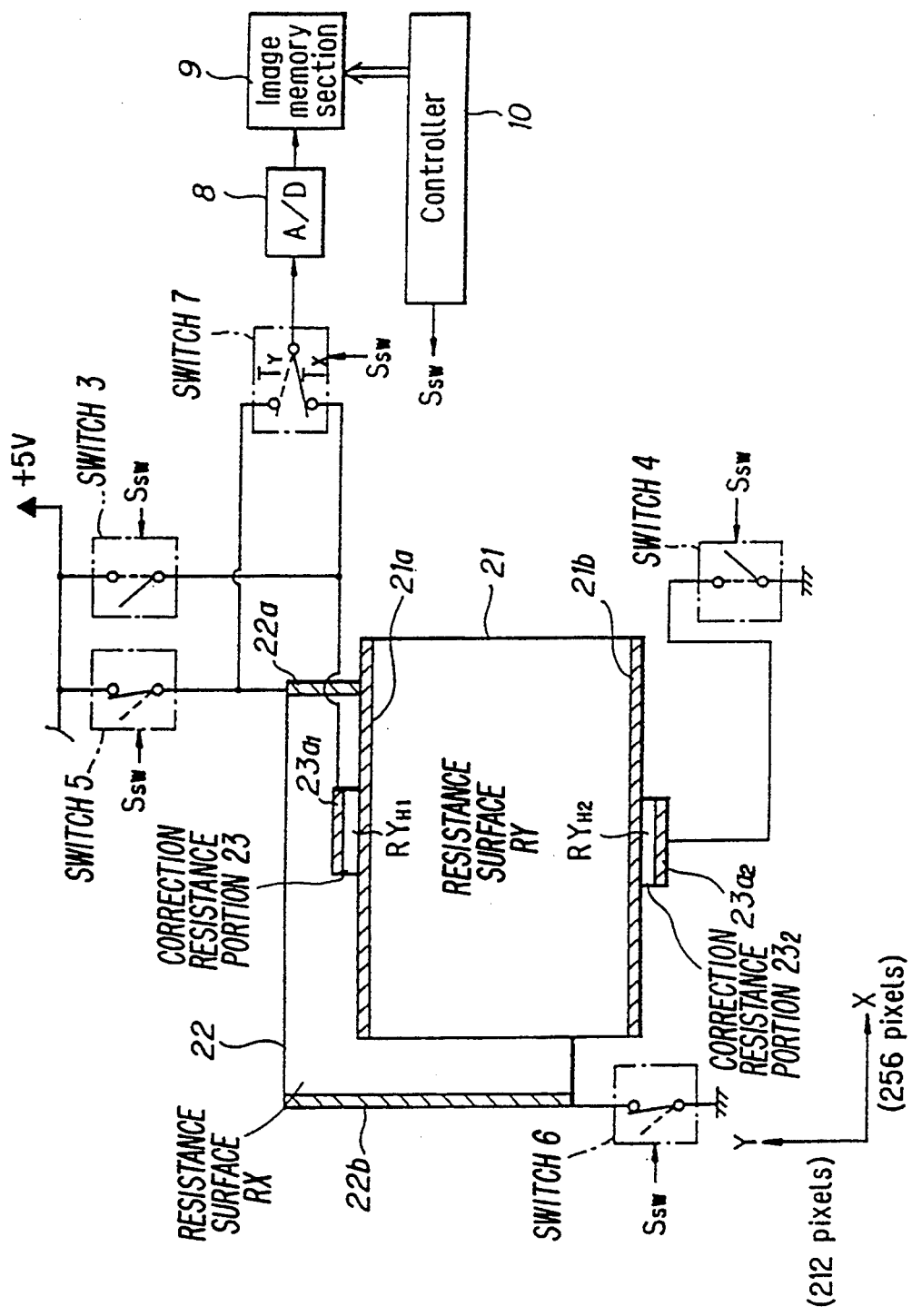
FIG. 13 is a block diagram showing a ninth embodiment of the coordinate apparatus of this invention.

In a ninth embodiment of this invention, shown in FIG. 13, the correction resistor portion has been divided into two, with a correction resistor portion $23_1$ being formed on the side of the electrode 21a and a correction resistor portion $23_2$ being formed on the side of the electrode 21b.

An electrode $23a_1$ for the correction resistor portion $23_1$ is then connected to the switches 3 and 7 and a correction resistance surface $RY_{H1}$ is formed between the electrode 21a and an electrode $23a_1$. Also, the correction resistor portion $23_2$ is formed so as to be connected to the electrode 21b and a correction resistance surface $RY_{H2}$ is formed between the electrode 21b and an electrode $23a_2$. The electrode $23a_2$ is then connected to an earth via the switch 4.

At this time, the correction resistor is taken to be $RY_h$, as with each of the previous embodiments, where RYH=RYH1+RYH2. This is then used to obtain the resistor ratio $RY:RY_h$ in the same way and the results obtained are the same as those for each of the previous embodiments.

In this method, the electrode 21a and the detection resistance surface RX, and the electrode 21b and the correction resistor portion 232 are electrically connected using wire etc., and so forth.

In each of the above embodiments, the detection voltage for each of the detection resistance surfaces RX and RY has been obtained using the terminals 21a and 22a. It would, however, be possible to use electrodes 21b and 22b, or use two electrodes in place of each electrode to read off the voltage.

Tenth Embodiment

Figure 4:
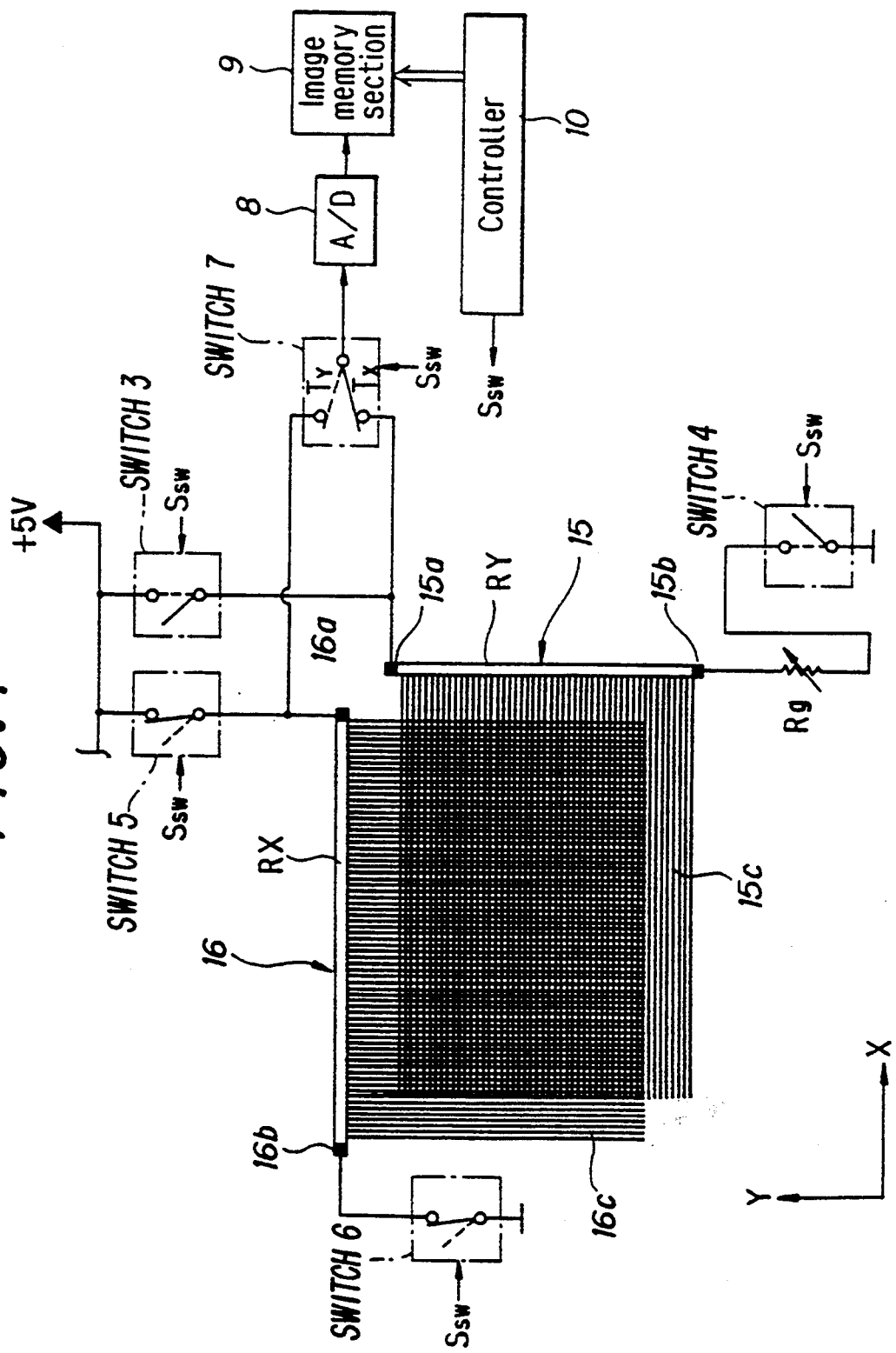
FIG. 4 is a block diagram showing a further example of a structure of a coordinate input apparatus which preceded this invention.
Figure 14:
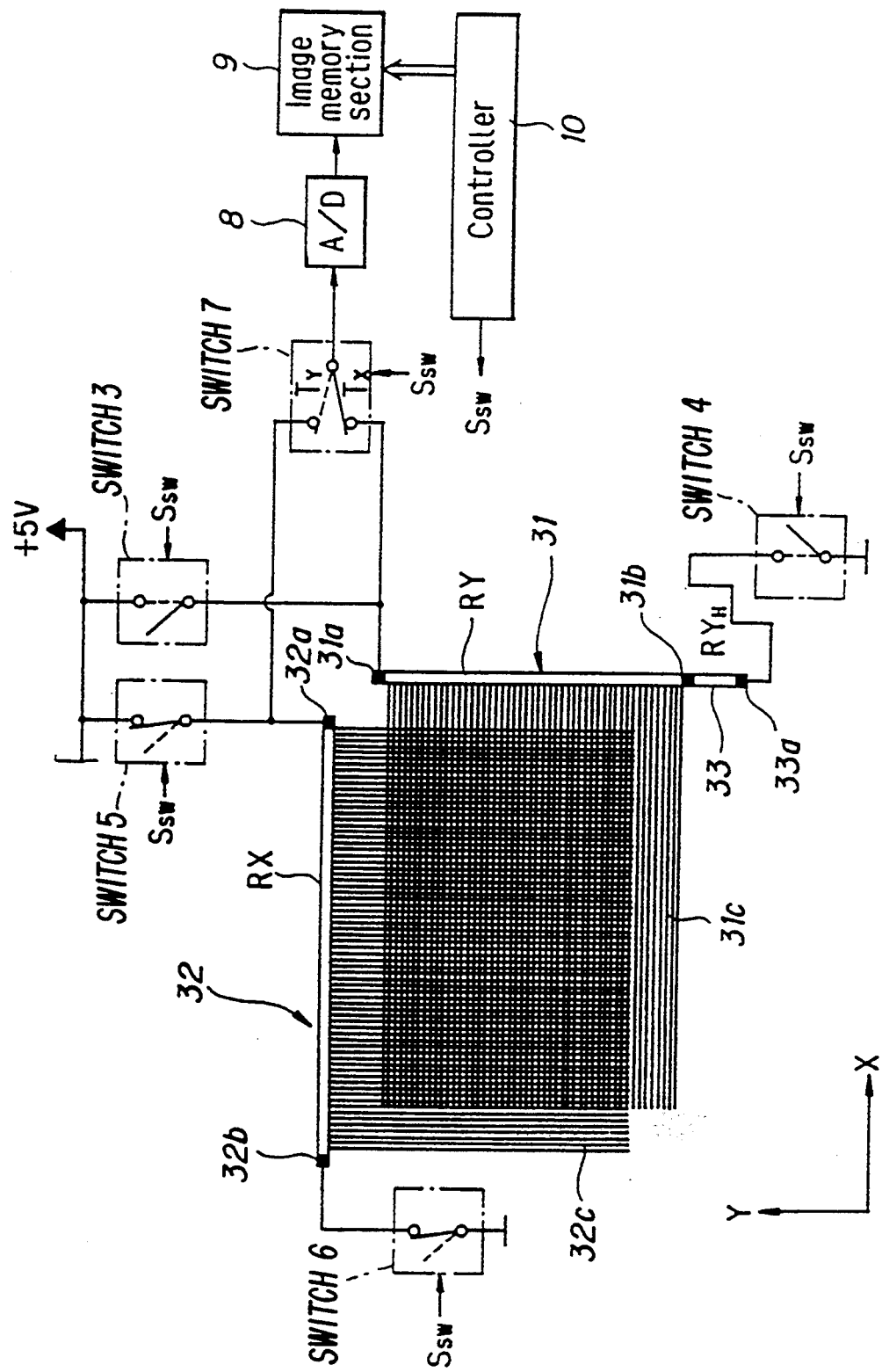
FIG. 14 is a block diagram showing a tenth embodiment of the coordinate apparatus of this invention.

FIG. 14 shows a tenth embodiment of this invention, in which coordinate input detection is carried out using the same method as that used by the apparatus shown in FIG. 4. Portions which are the same as those shown in FIG. 4 will be assigned the same numerals and a detailed description thereof will be omitted.

In this case, the numerals 31 and 32 indicate the input detection members. The input detection member 31, which is an input surface, is rectangular in shape and has a resistor RY running along one of its shorter edges. This resistor then has electrodes 31a and 31b at each of its ends. The resistor RY has conductive wires 31c which run parallel to the X-direction and are formed at a spacing which is the same as that of the pixel spacing along the Y-axis direction.

Also, a resistor RX is formed in the X-direction, lengthwise on the input detection member 32 which makes up the rectangular input surface, with electrodes 32a and 32b formed at its ends. Conductive wires 32 spaced at intervals which are the same as those of the pixel spacing in the X-direction are then formed so as to exit the resistor RX in a direction which is parallel to the Y-axis.

If the X-axis is taken to have 256 pixels, the Y axis is taken to have 212 pixels and the A/D converter 8 is taken to have a resolution of 256, and when detecting Y coordinates, incompatibilities occur between the detection voltage and the A/D converter resolution and pixel number for the image memory 10. In order to eliminate these incompatibilities, in this embodiment a correction resistor portion 33 in the form of a correction resistor $RY_h$ is formed opposite the resistor RY at the electrode 31b on the input detection member 31. This correction resistor $RY_h$ is connected to around via an electrode 33a and is made from the same member which forms the resistor for the Y-axis detection resistor RY.

During detection of the Y-axis coordinates, the applied voltage of 5 V is applied across electrodes 31a and 33a. However, by using the correction resistor $RY_h$, the relationship between the resistor between electrode 31a and electrode 31b and the relationship between electrode 31b and electrode 33a, i.e. the ratio $RY:RY_h$, can be adjusted to be 212:44. The voltage for detecting on the resistor RY can then be appropriately split up into 212 steps with respect to the resolution of the converter which is 256. The same effects which were obtained for the first embodiment can therefore also be obtained for a coordination apparatus which employs this kind of input detection member. Only the dimensions therefore have to be decided to decide the resistor ratio ($RY:RY_h$) providing that the resistor RY and the correction resistor $RY_h$ are made from the same resistor member and formed at the same time, so that adjustment is no longer required.

Eleventh Embodiment

Figure 15:
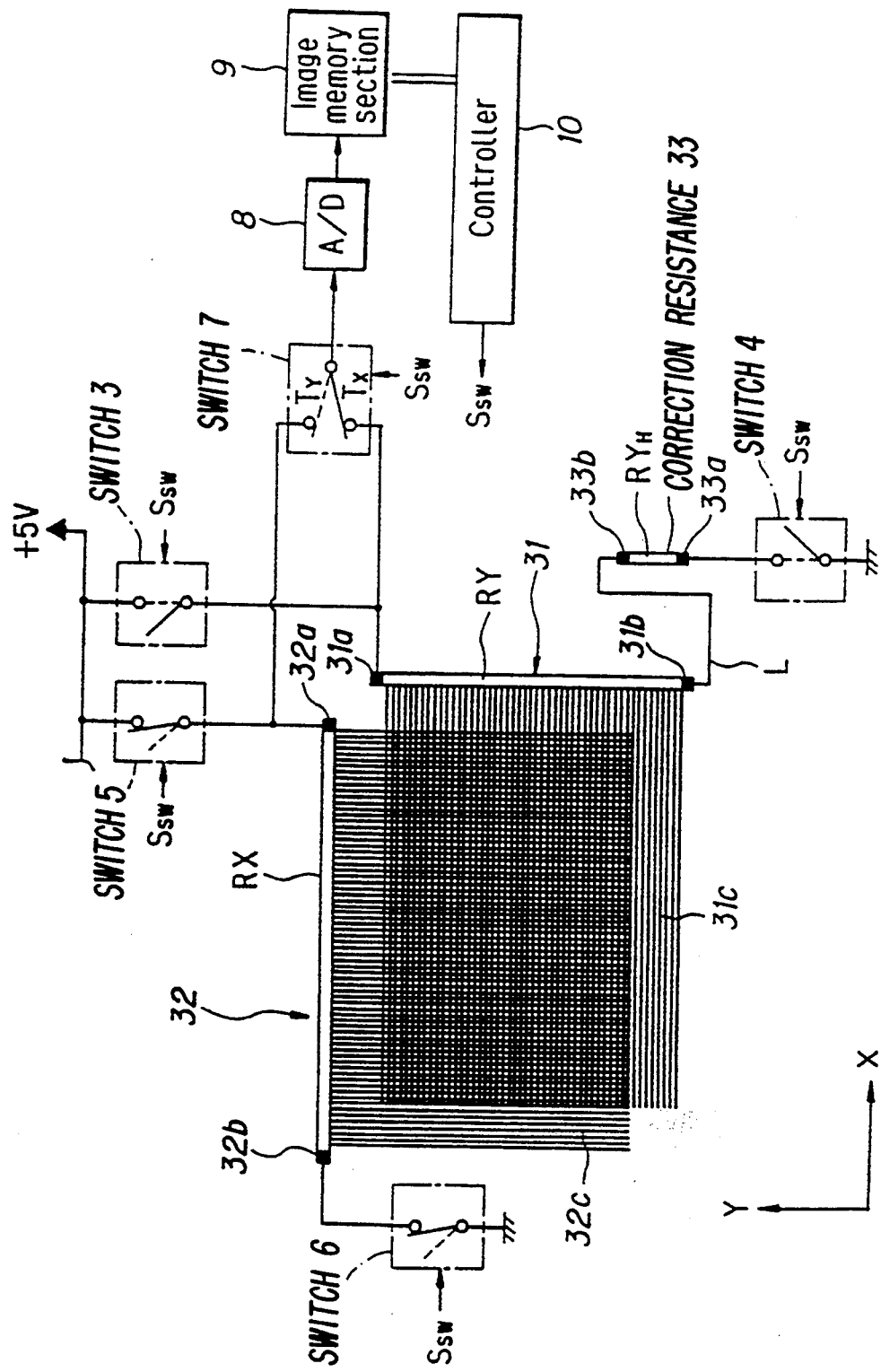
FIG. 15 is a block diagram showing an eleventh embodiment of the coordinate apparatus of this invention.

FIG. 15 is a view of an eleventh embodiment of this invention which is a coordination input apparatus which employs the same technique as that of the tenth embodiment. However, the correction resistor $RY_h$ is not physically connected to the electrode 31b of the input detection member 31 and an electrode 33b for the correction resistor 33 is instead connected to electrode 31b via a lead.

Twelfth Embodiment

Figure 16:
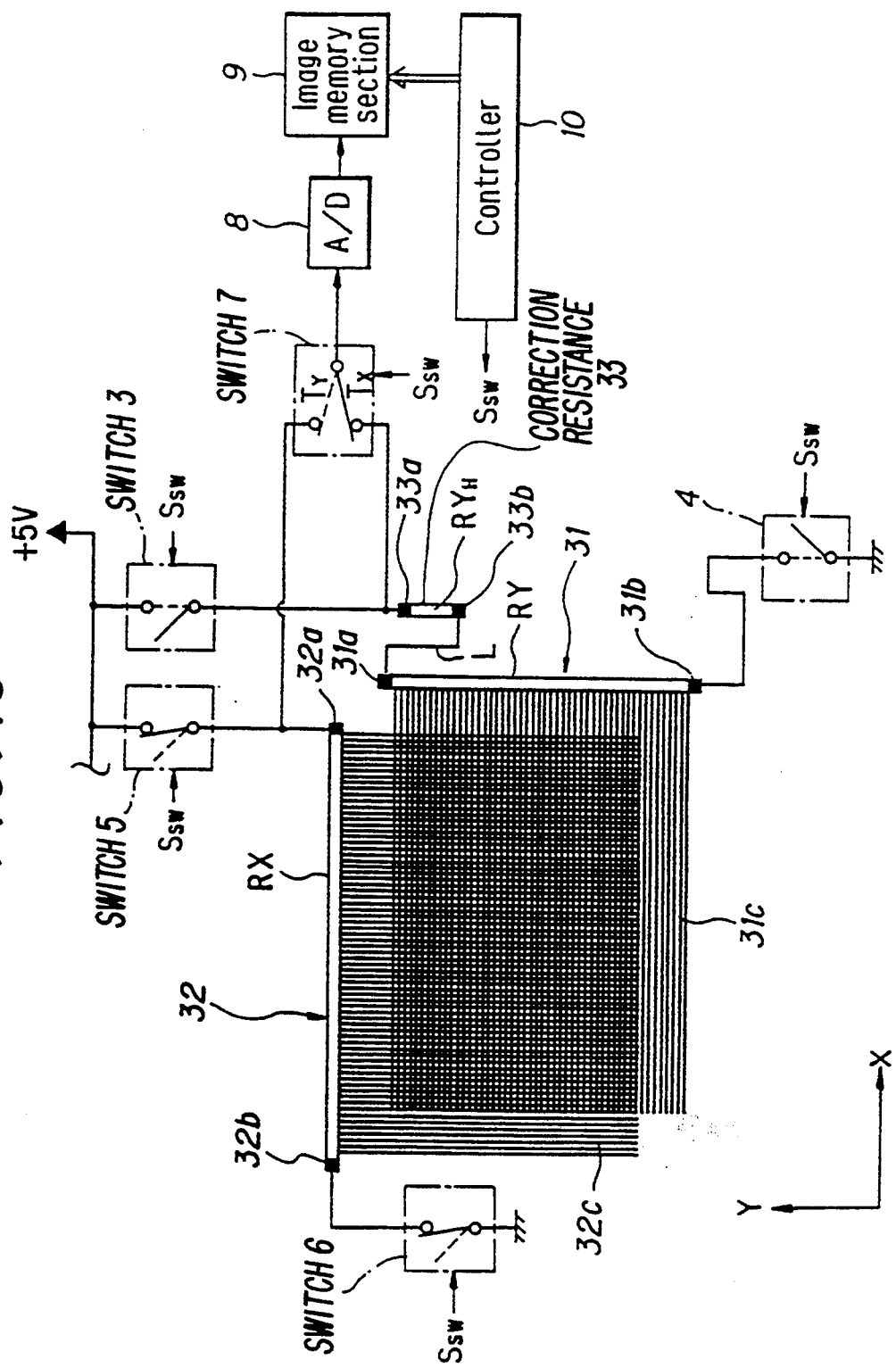
FIG. 16 is a block diagram showing a twelfth embodiment of the coordinate apparatus of this invention.

FIG. 16 is a view of a twelfth embodiment of this invention. In this embodiment, the correction resistor 33 is connected to the electrode 31a via a lead L.

Also, the electrode 33a for the correction resistor 33 is connected to the switches 3 and 7 and a lead is connected between electrode 33b and electrode 31a.

Thirteenth Embodiment

Figure 17:
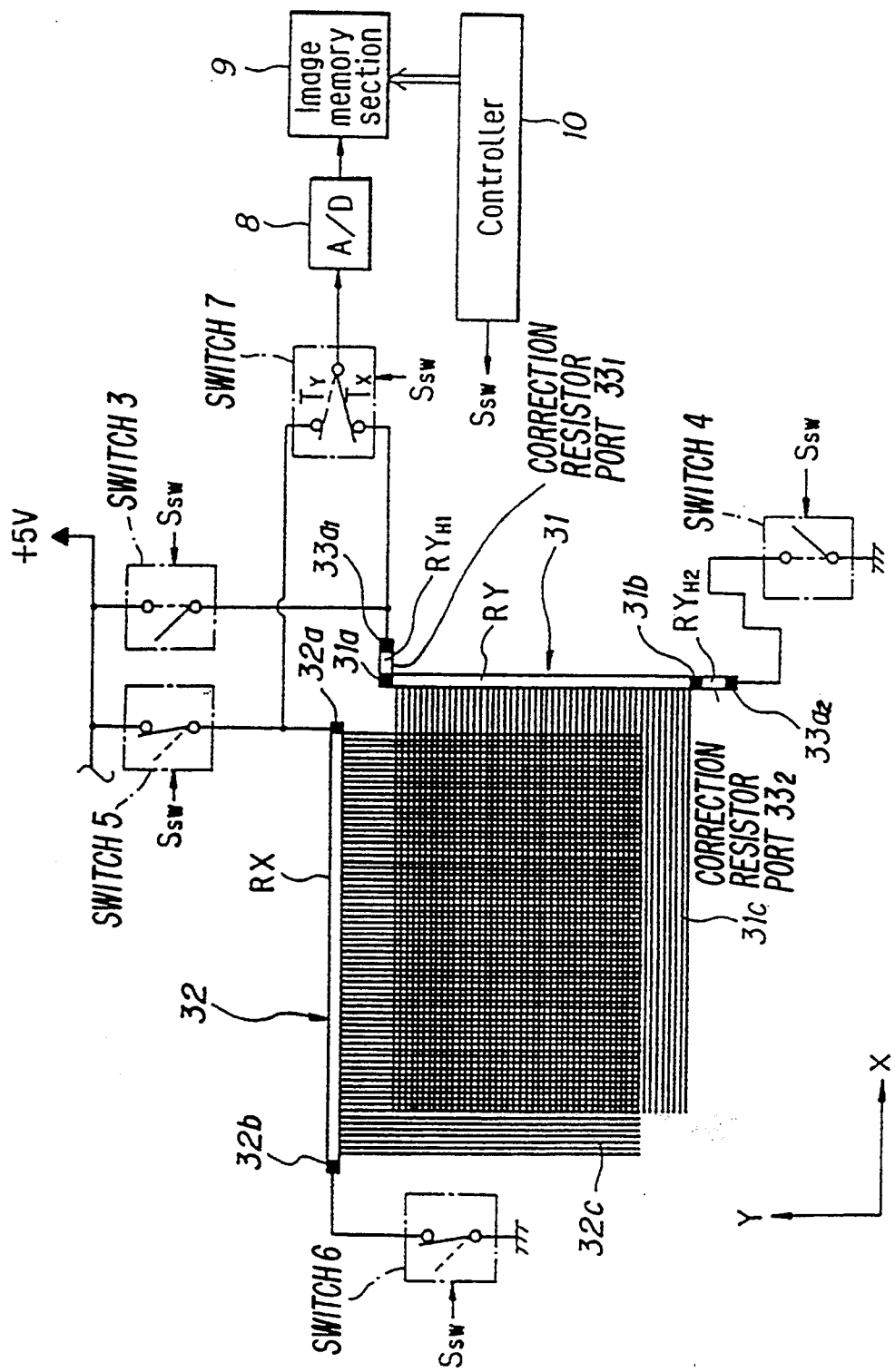
FIG. 17 is a block diagram showing a thirteenth embodiment of the coordinate apparatus of this invention.

FIG. 17 is a view of a thirteenth embodiment of this invention. In this embodiment, the correction resistor has been separated into two parts shown by $33_1$ and $33_2$ which are connected to the electrodes 31a and 31b respectively.

Also, the electrode $33a_1$ for the correction resistor $33_1$ is connected to switches 3 and 7 as well as being connected to electrode 31a via a correction resistance surface RY1.

A correction resistance surface $RY_{H2}$ for the correction resistor $33_2$ is formed so as to be connected to the electrode 31b and an electrode $33a_2$ connected to the other end thereof is then connected to earth via the switch 4.

The results obtained for each of these embodiments 15 to 17 are the same as those obtained for the tenth embodiment.

The present invention is by no means limited to each of these embodiments and any variations which are within the indicated scope are possible.

What is claimed is:

1. A coordinate input apparatus comprising:
    an input surface formed by first and second input detection members, with said first input detection member having a first rectangular resistance surface with electrodes at each long side and said second input detection member having a second rectangular resistance surface with electrodes at each short side, and said first and second resistance surfaces for said first and second input detection members being arranged in such a manner as to be overlaid so as to not come into contact if no pressure is applied to said input surface and come into contact at a pressurized portion if pressure is applied to said input surface; and
    detection means for detecting input coordinates on X-Y coordinate axes in said input surface based on resistor values taken when said resistance surfaces for said first and second input detection members come into contact at said pressurized portion, wherein a correction resistance surface which is connected to at least one of said electrodes disposed at each of the sides of said first input detection member is formed in the same plane as said rectangular resistance surface for said first input detection member.

2. A coordinate input apparatus according to claim 1, wherein said correction resistance surface is formed so as to be connected at approximately the central portion of said electrode formed at the long side of either said first or said second rectangular input surface.

3. A coordinate input apparatus according to claim 1, wherein when the ratio between the number of coordinate elements in the direction of the short side of said input surface and the number of coordinate elements in the direction of the long side is n:m, and the resistor ratio between the first rectangular resistance surface and the correction resistance surface at said first input detection member is $n:\{(m/k)-n\}$ (where $k=1, 2 \ldots$).

4. A coordinate input apparatus according to claim 1, wherein said first rectangular resistance surface for said first input detection member and said correction resistance surface are formed by the same resistor member.

5. A coordinate input apparatus according to claim 1, wherein said first rectangular resistance surface for said first input detection member and said correction resistance surface are formed by means of the same printing process.

6. A coordinate input apparatus comprising:
    a rectangular input surface formed by first and second input detection members, with a first resistor, from which first conductive wires running parallel to the long side of said rectangular input surface protrude at pixel intervals, being formed along the short side with respect to said rectangular input surface of said first input detection member, a second resistor, from which second conductive wires running parallel with the short side of said rectangular input surface protrude at pixel intervals, being formed along the long side with respect to said rectangular input surface of said second input detection member, electrodes being set up at each end of said first and second resistors, and said first and second conductive wires for said first and second input detection members being arranged in a matrix in such a manner as to be overlaid so as to not come into contact if no pressure is applied to said rectangular input surface and to come into contact at a pressurized portion if pressure is applied to said rectangular input surface; and
    detection means for detecting input coordinates on X-Y coordinate axes in said rectangular input surface based on resistor values taken when said first and second resistors for said first and second conductive wires come into contact at said pressurized portion, wherein a correction resistor which is connected to at least one of said electrodes disposed at each of the sides of said first input detection member is formed in the same plane as said first resistor for said first input detection member.

7. A coordinate input apparatus according to claim 6, wherein when the ratio between the number of coordinate elements in the direction of the short side of said rectangular input surface and the number of coordinate elements in the direction of the long side is n:m, and the resistor ratio between said first resistor and the correction resistor at said first input detection member is $n:\{(m/k)-n\}$ (where $k=1, 2 \ldots$).

8. A coordinate input apparatus according to claim 6, wherein said first resistor for said first input detection member and said correction resistor are made from the same resistor member.

9. A coordinate input apparatus according to claim 6, wherein said first resistor for said first input detection member and said correction resistor are formed by the same printing process.

10. A coordinate input apparatus comprising:
    a rectangular input surface having X and Y coordinate axes of differing lengths formed by first and second input detection members, with said first input member having a first resistance surface with electrodes formed at each long side and said second input detection member having a second resistance surface with electrodes formed at each long side, and said first and second resistance surfaces for said first and second input detection members being arranged in such a manner as to be overlaid so as to not come into contact if no pressure is applied to said rectangular input surface and come into contact at a pressurized portion if pressure is applied to said rectangular input surface;

an A/D converter for performing A/D conversion at an X-axis direction resolution at a voltage obtained when said first and second resistor members for said first and second input detection members come into contact at said pressurized portion; and storage means for storing X and Y coordinates outputted from said A/D converter, wherein a correction resistance surface which is connected to at least one of said electrodes set up at each of the sides of said first input detection member is formed in the same plane and from the same member as said resistance surface for said first input detection member.

11. A coordinate input apparatus comprising:

a rectangular input surface having X and Y coordinate axes of differing lengths formed by first and second input detection members, with said first input member having conductive wires running parallel to the long side of said rectangular input surface protruding at pixel intervals from a first resistor, having electrodes disposed at both ends, formed along a short side with respect to said rectangular input surface, said second input member having conductive wires running parallel with the long side of said rectangular input surface protruding at pixel intervals from a second resistor, having electrodes disposed at both ends, formed along a short side with respect to said rectangular input surface, and said first and second conductive wires for said first and second input detection members being arranged in a matrix in such a manner as to be overlaid so as to not come into contact if no pressure is applied to said rectangular input surface and come into contact at a pressurized portion if pressure is applied to said rectangular input surface;

an A/D converter for performing A/D conversion at an X-axis direction resolution on a voltage obtained when said first and second resistor members for said first and second input detection members come into contact at said pressurized portion;

storage means for storing X and Y coordinates outputted from said A/D converter, wherein a correction resistor which is connected to at least one of said electrodes disposed at each of the sides of said first input detection member is formed in the same plane and from the same member as said first resistor for said first input detection member.

* * * * *